INVENTOR:
CHARLES E. RETTIG,
BY Albert S. Richardson Jr
ATTORNEY

United States Patent Office 3,560,835
Patented Feb. 2, 1971

3,560,835
MEANS FOR PROTECTING ELECTRIC POWER CONVERTER FROM COMMUTATION FAILURE
Charles E. Rettig, Brookfield, Wis., assignor to General Electric Company, a corporation of New York
Filed Jan. 3, 1969, Ser. No. 788,790
Int. Cl. H02m 5/14
U.S. Cl. 321—7                                        10 Claims

ABSTRACT OF THE DISCLOSURE

Power conversion apparatus using electric valves to control the power delivered from a source of electricity to a load circuit is protected from commutation failure by providing means responsive to the apparatus operating with a margin angle that is smaller than a desired minimum for activating means for adding capacitance to the load circuit. In one form of the invention, a reduced-scale, increased-sensitivity mimic conversion apparatus is used to detect incipent commutation failure.

---

This invention relates generally to electric power conversion apparatus of a class known as frequency changers, and more particularly it relates to improvements in a frequency multiplier of the synchronous, solid-state switching type supplying electric energy to a tank circuit whose reactance is subject to change.

The use of synchronous switching type converters for multiplying the frequency of commercially available power is old and well known in the art. The switching components employed in such converters are generally referred to as electric valves and may specifically comprise magnetic elements (e.g., saturable reactors) or electronic elements (e.g., ignitrons, thyratrons, or the presently preferred solid-state thyristors). By properly arranging and controlling at least one set of six valves that are cyclically operated in a predetermined sequence, A-C electric power supplied from a three-phase source of sinusoidal voltage of fundamental frequency (e.g., 60 hertz) can be directly converted to single-phase power of an harmonic frequency (e.g., 180 hertz) for energizing a connected load.

In operation, each valve of the harmonic frequency multiplier has a non-conductive or blocking state, in which it presents very high impedance to the flow of load current, and a conductive or turned on state of negligible impedance, and the cyclically recurring moment of time at which it switches from the former state to the latter is determined by an associated control or trigger signal. The turn-on instant can be expressed in electrical degrees (known as the "firing angle") measured from the appropriate zero crossing of line-to-neutral voltage of the input phase to which the valve is connected. By advancing (decreasing) the firing angle from a fully retarded condition (approximately 180 degrees) to the vicinity of 60 degrees, the RMS magnitude of the third-harmonic output voltage can be increased from zero toward maximum.

Once turned on, a valve will continue conducting until "forward" current is subsequently extinguished by the action of the external circuit in which the valve is connected. This turn off process can be referred to as "commutation." In the case of electronic valves such as thyristors, successful switching from conducting to nonconductive states requires that reapplication of forward anode-to-cathode voltage be delayed after forward current reaches zero until the valve has had time to regain completely its blocking capability. The interval of time required for this purpose is generally known as "turn-off time," and to ensure reliable commutation the converter "margin angle" has to be at least as long.

The interval of time beginning at the moment that forward current in an outgoing (relieved) valve is reduced to zero and ending when the main electrodes of this valve are next subjected to forward voltage is herein referred to as the margin angles of the converter. This is the time actually available during each operating cycle for turning off a valve, and it equals the turn-off time of the valve plus any ensuing period of reverse voltage across the turned off device. If the margin angle were not sufficient to allow the outgoing valve to recover its ability to block forward voltage, this valve would prematurely resume conduction which event is herein called a commutation failure.

In practice the aforesaid frequency multiplying converter is ordinarily connected to a tank circuit whose inductance (L) typically comprises and induction heating coil, which is the load to be energized, and whose capacitance (C) is provided by a bank of capacitors connected in parallel circuit relationship with the coil. Under most operating conditions cyclic commutation of the respective valves in the converter will be favorably influenced by load voltage if the current being supplied to the tank circuit leads voltage (a leading power factor) and will be adversely influenced if current lags voltage (a lagging power factor). The size of the margin angle and hence the ability to commutate is affected not only by power factor but also by the magnitude of load impedance and the particular firing angle desired. In the frequency multiplier herein contemplated, all of these vital parameters are variables, and their complex and dynamic interrelationships make it extremely difficult to program the converter in a manner that will always ensure successful commutation. For example, the load impedance that the heating coil imposes on the converter will vary in magnitude and phase from charge to charge and during the course of each heat. Consequently the power factor of the tank circuit can change appreciably in a lagging sense from an initially satisfactory value, and as a result the margin angle of the converter can shrink to a point where commutation fails. Even if a constant power factor were assumed, there is a possibility of running out of margin angle as the firing angle is advanced (i.e., as the delay angle is reduced) by the associated regulator attempting to increase the amount of voltage and/or current that the converter delivers to the load during a heating cycle.

Accordingly, a general objective of the present invention is to equip a frequency multiplying converter with protective means for ensuring successful commutation in spite of adverse changes in the magnitude and power factor of a load.

Another objective is to provide means, compatible with the protective means referred to in the preceding paragraph, for enabling a converter to operate with an advantageous margin angle.

Still another object is the provision of unique means for detecting incipient commutation failures in static power converters.

In carrying out the invention in one form, a frequency tripling converter of the synchronous, solid-state switching type is adapted to be connected to a tank circuit that includes a capacitor bank equipped with capacitor changing means for adding capacitance when actuated, and protective means is provided for actuating the capacitor changing means whenever the margin angle of the converter decreases under a predetermined desirable minimum. As a result of the added capacitance, the Q of the tank circuit tends to increase, and the margin angle of the converter is beneficially extended.

Capacitor changing means suitable for practicing this invention are known in the art and in fact have heretofore been disclosed in automatic load tuning systems where they are actuated to correct a detected error between a given reference and the actual power factor (or the actual magnitude) of power being delivered to the tank circuit. However, these prior art schemes for regulating power or power factor will not protect the converter from commutation failure due to insufficient margin angle under all operating conditions that are likely to be encountered in practice.

One way to obtain a signal for actuating the capacitor changing means in response to incipient commutation failure is to employ mimic conversion apparatus which is a reduced-scale, increased-sensitivity equivalent of the frequency tripler. The mimic apparatus is supplied with voltages representing those at the input and the output terminals of the tripler and with the same control signals, and it is arranged to have a smaller margin angle whereby a commutation failure in the mimic will anticipate a corresponding failure in the tripler. The capacitor changing means is actuated in response to commutation failure in the mimic so as to add capacitance and thereby prevent the margin angle from shrinking enough to cause commutation failure in the tripler. Preferably the firing angle of the control signals for the respective valves in the frequency tripler is fully retarded at the same time the capacitor changing means is actuated, whereby power is effectively removed from the tank circuit prior to capacitor switching.

In another suggested embodiment of the invention, the protective means is also arranged to cause the capacitor changing means to subtract capacitance from the tank circuit in the event the converter margin angle exceeds a predetermined desirable maximum. This will correct any unnecessary overshoot in the capacitance adding step. Furthermore, the resulting change in power factor advantageously reduces the margin angle and enables the converter to deliver more power to the load at a given firing angle.

The invention will be better understood and its various objects and advantages will be more fully appreciated from the folowing description taken in conjunction with the accompanying drawings in which.

Figure 1:
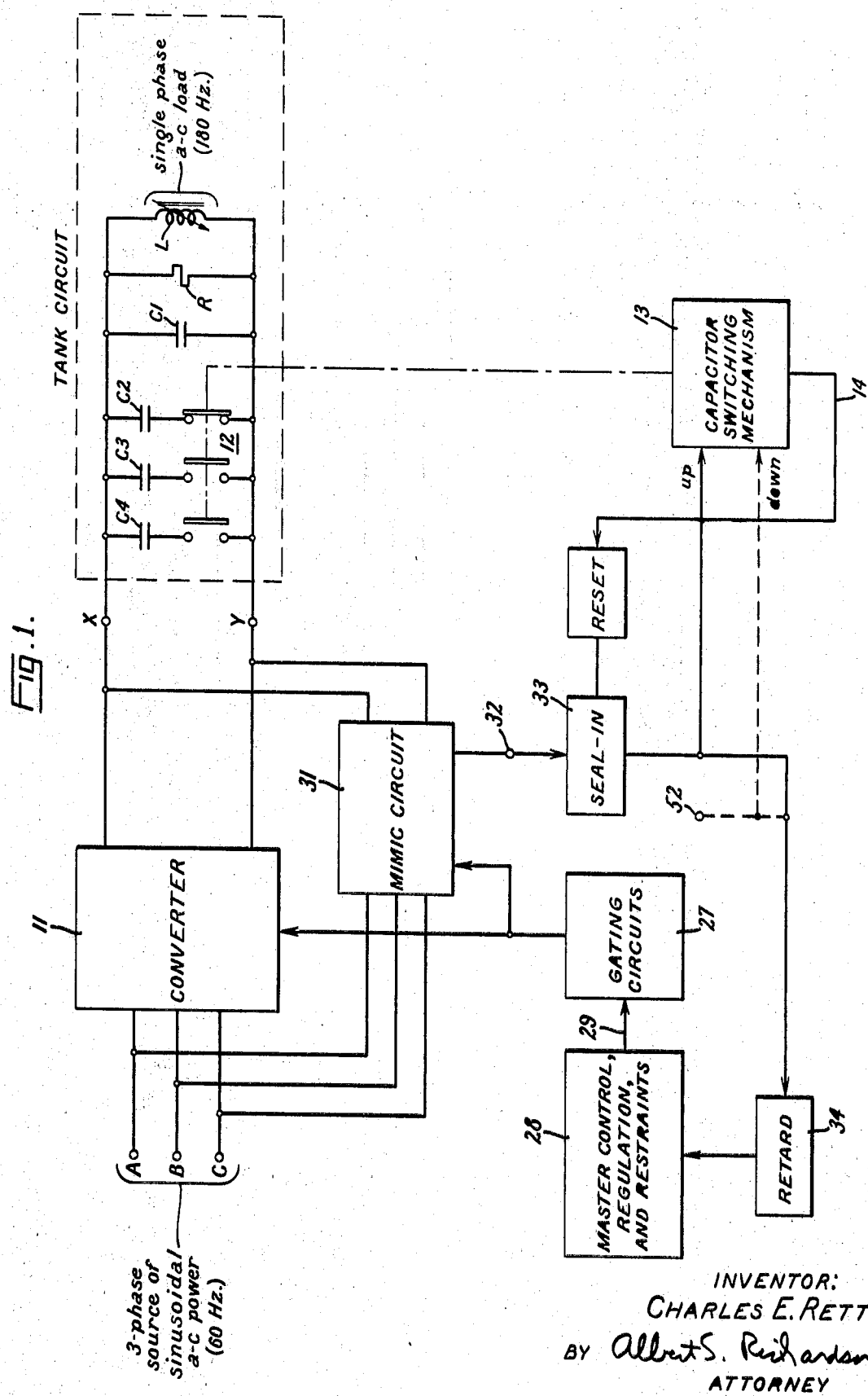
FIG. 1 is a schematic block diagram of electric power conversion apparatus embodying my invention.

Referring now to FIG. 1, there is shown for purposes of illustration an electric power converter 11 connected between a set of three input terminals A, B, C and a pair of output terminals X, Y. The input terminals A, B, C are intended to be energized by sinusoidal voltage of fundamental frequency (e.g., 60 hertz) supplied by a commercial source of 3-phase A-C electric power. The output terminals X, Y are shown connected to a tank circuit that includes a single-phase A-C load, represented symbolically by a resistor R in parallel with an inductor L, and a parallel bank of capacitors of assorted sizes C1, C2, C3, C4, etc. The load is actually an induction heating coil or the like, and therefore it has been depicted as having a variable value of inductance L.

The capacitor bank is equipped with capacitor changing means comprising a plurality of contacts 12 that are selectively actuated by an associated capacitor switching mechanism 13. Operation of the capacitor changing means will in effect vary the value of capacitance C shunting the inductance L in the tank circuit. In practice a motor driven rotary can switch or an assembly of electromechanical stepping switches can be used for this purpose. The details of the mechanism 13 are not shown since they are not critical to an understanding of the present invention, it being sufficient to note that the contacts 12 are appropriately manipulated to add an increment of capacitance on receipt of an "up" command and to subtract an increment of capacitance on receipt of a "down" command. It should also be noted that at the conclusion of each capacitor changing step the mechanism 13 issues an appropriate momentary signal 14 to mark this event.

Figure 2:
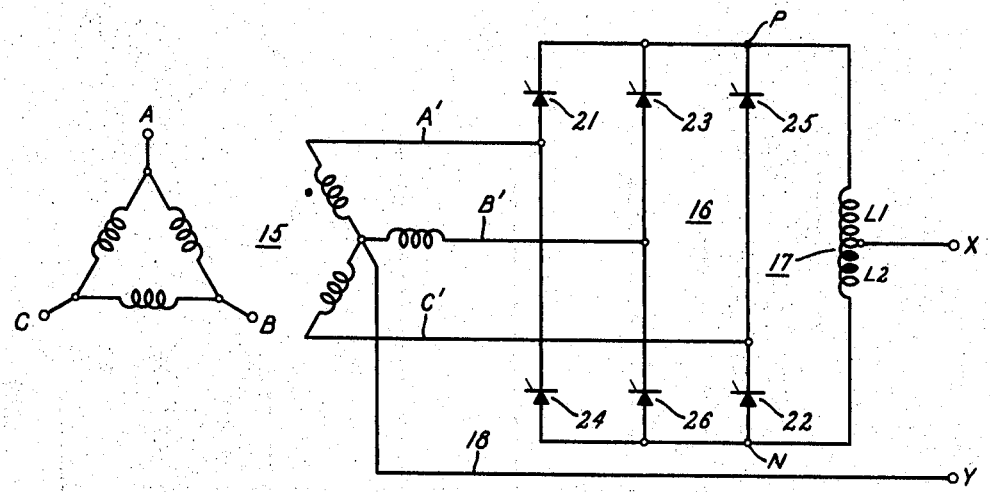
FIG. 2 is a schematic circuit diagram of the converter shown as a single block in FIG. 1.

The converter 11 preferably is of the synchronous, solid-state switching type and is designed to energize the induction heating coil in the tank circuit with alternating current of a predetermined (e.g., third) harmonic frequency (e.g., 180 hertz). FIG. 2 shows in simplified form the power circuit of one such converter.

The illustrated converter is a frequency tripler, and it is seen to comprise a 3-phase power transformer 15, a group 16 and six load-current conducting electric valves, and a spanning reactor 17. The primary windings of the transformer 15 are connected in a delta configuration across the separate input terminals A, B, and C of the power conversion apparatus. The corresponding secondary windings are arranged in a star configuration, with their common terminals being coupled to the lower output terminal Y via a neutral conductor 18 or equivalent. The other terminals of the three phases of the transformer secondary are connected to the lines A', B', and C', respectively, and a conventional phase rotation A'–B'–C' is assumed.

The respective valves of the groups 16 are number 21 through 26. These valves preferably comprises semiconductor controlled rectifiers (generally known as thyristors), and as is shown in FIG. 2 they are interconnected to form a 3-phase bridge circuit whose A-C terminals are respectively connected to the lines A', B', C' and whose D-C terminals P and N are preferably spanned by the reactor 17. The reactor 17 is divided into two mutually coupled halves L1 and L2, and the upper output terminal X is connected directly to a center point thereof.

By supplying the respective control electrodes (gates) of the six valves 21-26 with an appropriately timed family of cyclically generated control or trigger signals, the valves are turned on in numerical sequence in synchronism with the 3-phase input voltage, and consequently a single-phase alternating voltage of third harmonic frequency (180 hertz) is developed across the output terminals X, Y. Each of the valves 21-26 remains in its turned-on state for approximately one-sixth or less of a whole cycle of the input voltage, and during each conducting interval a different input phase is in turn connected to the output terminals according to the following table:

| Conducting valve: | Phase |
|---|---|
| 21 | A'+ |
| 22 | C'– |
| 23 | B'+ |
| 24 | A'– |
| 25 | C'+ |
| 26 | B'– |

Means for cyclically generating the requisite trigger signals is shown in FIG. 1 as a block 27 labeled "gating circuits." The gating circuits can be of any suitable design for producing, in synchronism with the A-C input voltage, a succession of trigger signals for cylically firing the valves 21-26 of the converter 11 in numerical order. A circuit advantageously used in practice is disclosed in U.S. Pat. No. 3,095,513—Lezan. The timing of the family of trigger signals is determined by associated master control, regulation and restraint circuitry which in FIG. 1 have been lumped together in a single block 28 for the sake of drawing simplicity. This block includes conventional voltage regulating means with current limit override for supplying the gating circuits 27 with an error signal 29 of adjustable value. The firing angle of the periodic trigger signals generated by the gating circuits 27 will depend on the value of the error signal 29.

So long as the trigger signals for the respective valves of the bridge 16 shown in FIG. 2 are characterized by a firing angle in the range between approximately 60° and 180°, the operating mode of the frequency tripling converter is "discontinuous" and the valves will conduct load current, in turn, for intervals shorter than 60 electrical degrees. By advancing the firing angle to the vicinity of 60° or less, the respective conducting intervals are extended to 60° or longer, thereby obtaining a "continuous" mode of operation. The spanning reactor 17 permits any consequent overlapping of conduction between an odd-numbered and an even-numbered valve. This reactor also serves the advantageous purposes of limiting inrush current ($di/dt$) in each valve and of permitting parallel operation of other similar converters to increase the amount of power delivered to the load. Ordinarily the regulator 28, in attempting automatically to maximize the power delivered to the load, will call for the converter to operate in its "continuous" mode with the firing angle advanced as far as the built-in limits and restraints will permit.

In either the discontinuous or the continuous mode of operation, the actual margin angle of the illustrated converter must always exceed the characteristic turn-off time of the thyristors that are employed as the valves 21–26 to ensure successful commutation of the valves during each operating cycle. If a valve fails to commutate because of insufficient margin angle, that valve will conduct simultaneously with the next-conducting valve at a time when the input voltages are such as to circulate fault current of excessively high magnitude through the bridge 16. Correcting this condition requires operation of overcurrent protective means and results in undesirable interruptions of service.

As was explained above, the size of the converter margin angle depends on the interrelation of several variable factors, including principally the firing angle, the ohmic magnitude of the 180-hertz load to which the output terminals X, Y of the frequency tripler are connected, and the power factor of the load. In the power conversion apparatus as so far described, there is always a possibility that these parameters can combine in a way that results in a margin angle insufficient to sustain commutation. Both the magnitude of load impedance and the actual load power factor tend to vary in practice because neither the resistance R nor the inductance L of an induction heating load is constant. For a given magnitude of load impedance, the margin angle of the converter tends to decrease as the load power factor changes in a lagging sense. The firing angle of the converter is itself a variable, being advanced from approximately 180° to the vicinity of 60° in order to increase the RMS magnitude of the third-harmonic output voltage, and this also tends to reduce the margin angle. In operation the magnitude of load impedance will sometimes increase, whereby the real power that the converter delivers to the load tends to decrease, and in an attempt to preserve the desired magnitude of power, the regulator will automatically respond by adjusting the error signal so as to advance the firing angle an appropriate amount. As noted above, this has the undesirable effect of shrinking the converter margin angle, unless the effect is counter-acted by an appropriate increase in the phase angle by which load current leads voltage (i.e., a change in load power factor in a leading sense). In spite of the difficulty of analyzing and predicting all of these variables and others, commutation failure in the converter can be prevented by utilizing my invention which will next be described.

In accordance with my invention, successful commutation can be ensured under any and all operating conditions by commanding the capacitor switching mechanism 13 to add capacitance to the tank circuit whenever the margin angle of the converter 11 becomes smaller than a predetermined amount. As a result, the power factor of the load circuit is made more leading, and the margin angle is propitiously increased. The predetermined minimum margin angle is selected to be well above the turn-off time of the thyristors comprising the valves 21–26 in the converter 11. Thus my protective means actuates the capacitor changing means while the actual margin angle is still sufficient; in effect it detects an incipient commutation failure and initiates timely corrective action.

The above-described protective means can take at least two basically different forms. One way to tell that the margin angle is smaller than desired is to use mimic conversion apparatus which is fully described below. In accordance with an improved form, which is presently preferred in practice, the actual margin angle is detected and compared with an appropriate reference. The latter scheme is the invention of G. R. Lezan and is disclosed and claimed in his copending patent application S.N. 788,718 filed concurrently herewith and assigned to the assignee of this application.

In FIG. 1 a mimic conversion apparatus is represented by a block 31 labeled 'mimic circuit.' This circuit is coupled to the input and output terminals of the converter 11 and to the gating circuits 27. Internal details of the mimic circuit 31 have been shown in FIG. 3 and are described below where it will be apparent that an output pulse is produced at a terminal 32 in immediate response to the margin angle of the converter 11 becoming smaller than the aforesaid predetermined minimum. As is indicated in FIG. 1, the pulse at terminal 32 activates seal-in means 33 which in turn transmits to the capacitor switching mechanism 13 a sustained "up" command signal. The up command signal expires when the seal-in unit 33 is reset by the signal 14 that is issued by the mechanism 13 at the conclusion of its capacitance switching operation.

As is illustrated in FIG. 1, the same command signal is used to activate an ancillary phase retard component 34 of the regulator 28 which consequently adjusts the error signal 29 in a sense and to a degree that fully retards the firing angle of the trigger signals generated by the gating circuits 27. In this way operation of the protective means causes the converter 11 to reduce to zero its output voltage, and the capacitor bank is deenergized during the switching of contacts 12. Preferably this result is accomplished by arranging the component 34 to remove temporarily the reference for the current limit override in the regulator 28, and the reference is designed to "ramp" on when the component 34 is released on expiration of the command signal. As a result, after a capacitance switching operation the firing angle of the converter 11 does not abruptly advance from its fully retarded condition, and the tank circuit is reenergized in an orderly fashion.

Figure 3:
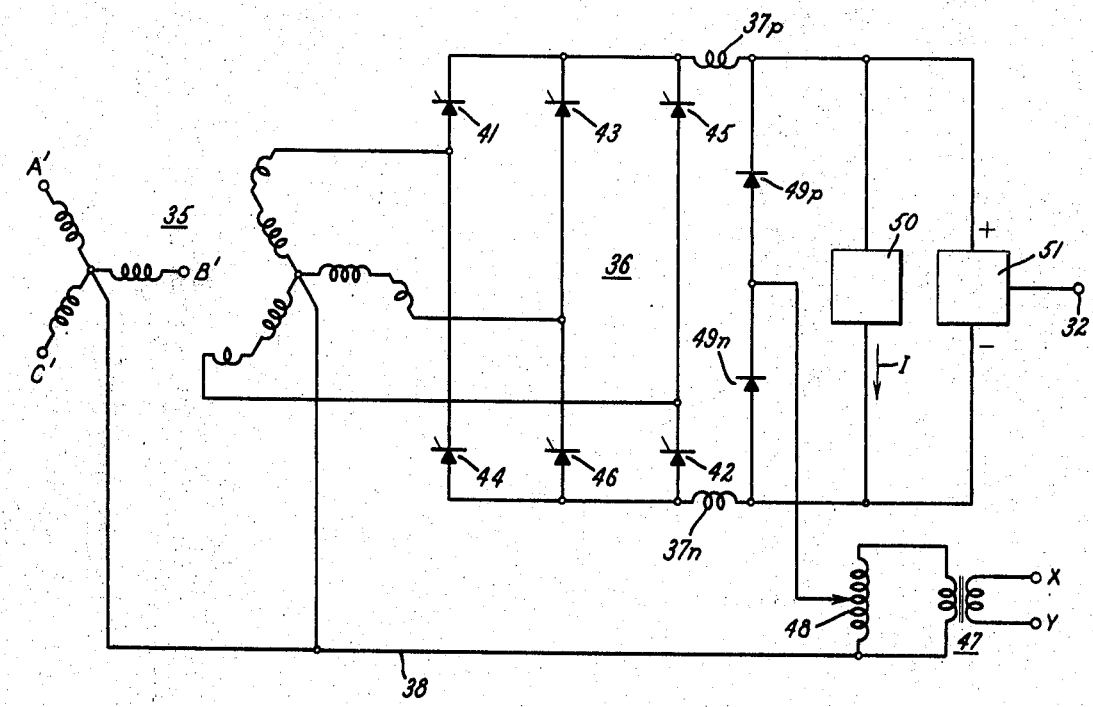
FIG. 3 is a schematic circuit diagram of the mimic conversion apparatus shown as a single block in FIG. 1.

Circuit details of the mimic 31 are shown in FIG. 3. The mimic conversion apparatus is a reduced-scale, increased-sensitivity equivalent of the power converter 11, and toward this end it includes six controlled switching components 41–46 interconnected and arranged to form a bridge circuit 36 like the bridge 16 in converter 11. The A-C terminals of the bridge 36 are connected to the three phases or lines A', B', and C' of the power circuit by means of a 3-phase instrument transformer 35 having zig-zag secondary windings as shown. A transformer neutral 38 and the D-C terminals of the bridge 36 are connected to the load terminals X, Y by means of a single-phase, 180-hertz potential transformer 47 whose secondary voltage can be adjustably reduced by an auxiliary transformer 48. The spanning reactor 17 of the power converter 11 is represented in the mimic by a pair of linear inductors 37p and 37n having the same coupling coefficient as L1 and L2. There are connections (not shown) between the respective control electrodes of the six switching components 41–46 and the gating means 27 which generates trigger signals for the power converter 11, and consequently these components are sequentially turned on in response to said trigger signals in synchronism with the main valves 21–26.

The various elements and parameters of the mimic circuit shown in FIG. 3 are appropriately selected and sized so that the operation of the mimic apparatus essentially duplicates that of the power converter 11 but with a relatively smaller margin angle. By "relatively smaller" I mean that when the power converter 11 is operating with an actual margin angle just equal to the aforesaid predetermined minimum, the margin angle of the mimic converter 31 will be approximately equal to the characteristic turn-off time of the controlled switching components 41–46. Thus commutation will fail in the mimic although there is still sufficient margin angle to sustain successful commutation in the power converter 11. This result can be obtained by disproportionately reducing the measure of output voltage that is inserted in the mimic circuit by transformers 47 and 48 and by slightly retarding the input voltages that are reflected by the zig-zag secondary of transformer 35. Alternatively, the firing angle of the trigger signals supplied to the switching components 41–46 in the mimic circuit could be slightly advanced with respect to the firing angle of the trigger signals for the main valves 21–26 in the power converter 11.

As can be seen in FIG. 3, the circuit between the auxiliary transformer 48 and the positive inductor 37p of the mimic conversion apparatus includes a series diode 49p that is poled in opposition to the odd-numbered switching components 41, 43, and 45, and the circuit between transformer 48 and the negative inductor 37n includes a series diode 49n that is poled oppositely to the even-numbered switching components 42, 44, and 46. Normally both of the diodes 49p and 49n are continuously forward biased by current I supplied by a constant current source 50 which is connected directly thereacross. The magnitude of I is higher than the peak magnitude of mimic load current that is normally conducted by the switching components 41–46 during ordinary operation of the mimic apparatus, but it is lower than the magnitude of fault current that would otherwise tend to flow when commutation fails. The purpose of this arrangement is to enable the mimic apparatus to operate safely in a commutation failure state.

So long as the mimic conversion apparatus 31 is operating in its normal state, the diodes 49p and 49n are forward biased and there is negligible voltage drop in the connection between the common terminals of the inductors 37p and 37n. In the event of a commutation failure, the operating mode of the mimic apparatus changes and fault current in the simultaneously conducting switching components will quickly rise to a level equal to the magnitude of I, whereupon at least one of the diodes 49p and 49n becomes reverse biased (blocking) and fault current is limited to substantially that level by the constant current source 50. Each operating cycle this limited amount of fault current is ultimately extinguished by the action of the input and load voltages, but commutation failure will cyclically recur until the firing angle of the trigger signal is retarded or sufficient margin angle is restored. A voltage sensor 51 is connected across the diodes 49p and 49n and is arranged to produce a commutation failure signalling output pulse at the terminal 32 in response to the blocking voltage appearing across the diodes when fault current attains the aforesaid limited level.

Figure 4:
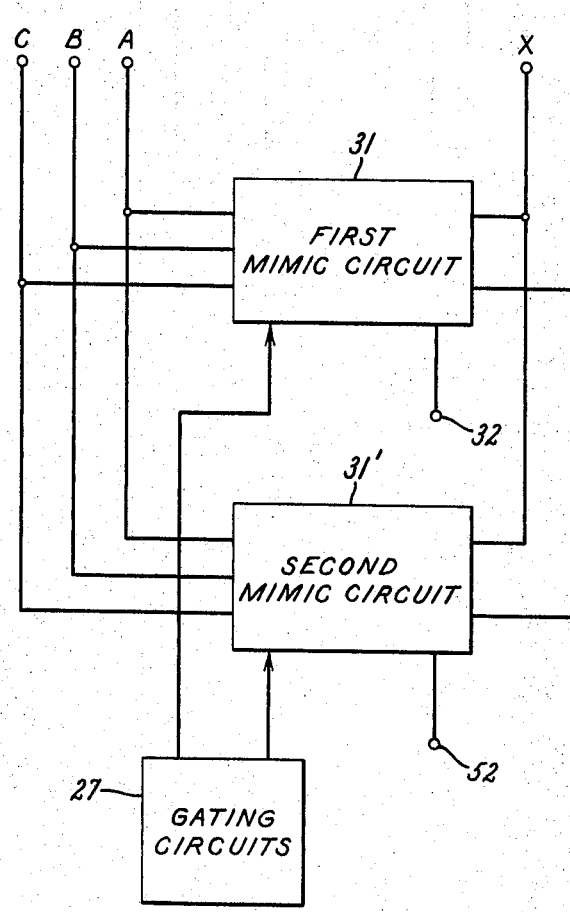
FIG. 4 is a schematic block diagram of my invention.

In some applications of power conversion apparatus embodying my invention, it may also be desirable to respond to excessively large margin angles by subtracting capacitance from the tank circuit, thereby deliberately changing the power factor of the load in a lagging sense to decrease the margin angle of the converter. The actual margin angle can thus be maintained within a desired range whose minimum is sufficiently large to ensure reliable commutation and whose maximum is sufficiently small to allow economic optimization of the installed equipment and its operation. Toward this end, I contemplate using a second mimic conversion apparatus built like the mimic circuit 31 but characterized by an even smaller margin angle. The second mimic circuit 31' is shown schematically in FIG. 4. Due to its relatively smaller margin angle, which is obtained by judiciously selecting parameters, the second mimic 31 will operate in a commutation failed state so long as the margin angle of the power converter is within the desired range. In the event the actual margin angle were to increase to a size without the desired range, the operating state of the second mimic will automatically change to "normal," and by means of a voltage sensor and appropriate logic a "down" command signal can be produced at a terminal 52 in response to this change in state. As was previously explained, the capacitor switching mechanism 13 is arranged to manipulate the contacts 12 so as to subtract an increment of capacitance from the tank circuit when actuated by the down command, and the firing angle of the converter 11 is fully retarded during this switching process.

While I have shown and described in detail one form of my invention by way of illustration, many modifications will undoubtedly occur to those skilled in the art. For example, the mimic principle disclosed herein can be advantageously used to detect incipient commutation failure of electric power converters of types other than a solid state, synchronous switching frequency multiplier. I therefore contemplate by the concluding portion of this specification to cover all such modifications as fall within the true spirit and scope of my invention.

What I claim as new and desire to secure by Letters Patent of the United States is:

1. Improved electric power conversion apparatus of the synchronous, solid-state switching type having a set of input terminals adapted to be connected to a polyphase source of sinusoidal voltage of fundamental frequency, a pair of output terminals adapted to be connected to a tank circuit including a load of variable inductance and a capacitor bank equipped with capacitor changing means for adding capacitance when actuated, means including a plurality of load-current conducting electric valves for interconnecting said input and output terminals, control signal generating means for cyclically turning on said valves in a proper sequence to supply the tank circuit with alternating current having a frequency which is a predetermined harmonic multiple of said fundamental frequency, and means for determining the characteristic firing angle at which said valves are turned on, wherein the improvement comprises: protective means coupled to said apparatus and to said capacitor changing means for actuating the latter in response to the apparatus operating with a margin angle under a predetermined size so as to add capacitance and thereby increase said margin angle.

2. The power conversion apparatus of claim 1 in which said protective means comprises (i) a mimic conversion apparatus which is a reduced-scale, increased-sensitivity equivalent of said power conversion apparatus, the mimic being coupled to said input and output terminals and to said control signal generating means and being characterized by a margin angle that is relatively smaller than the margin angle of said power conversion apparatus, and (ii) means for actuating said capacitor changing means in response to commutation failure in said mimic conversion apparatus.

3. Improved electric power conversion apparatus having a set of input terminals adapted to be connected to a polyphase source of sinusoidal voltage of fundamental frequency, a pair of output terminals adapted to be connected to a tank circuit including a load of variable inductance and a capacitor bank equipped with capacitor changing means for adding or subtracting capacitance on command, means including a plurality of load-current conducting electric valves for interconnecting said input and output terminals, said valves being cyclically turned on in a proper sequence to supply the tank circuit with alternating current having a frequency which is a predetermined multiple of said fundamental frequency, and control means for determining the characteristic firing angle at which said valves turn on, wherein the improvement comprises: means for producing a command signal in response to the conversion apparatus operating with an actual margin angle that is without a desired range of margin angles, said capacitor changing means being actuated by said command signal to change capacitance in a sense tending to restore the margin angle to within said desired range.

4. The improved power conversion apparatus of claim 3 in which there is additionally provided means for temporarily retarding said firing angle in response to said command signal.

5. The improved power conversion apparatus of claim 3 in which said command signal producing means is arranged to produce a first command signal in response to the margin angle becoming smaller than a predetermined minimum and to produce a second command signal in response to the margin angle exceeding a predetermined maximum, said capacitor changing means being actuated by said first command signal to add capacitance and being actuated by said second command signal to subtract capacitance.

6. The improved power conversion apparatus of claim 3 in which said command signal producing means comprises mimic conversion apparatus which is a reduced-scale, increased-sensitivity equivalent of said power conversion apparatus, the mimic including (i) a plurality of controlled switching components coupled to said input and output terminals and turned on in sequence in synchronism with said valves and (ii) means for enabling said mimic apparatus to operate in either a normal state or a commutation failure state, said mimic apparatus being characterized by a margin angle that differs from the margin angle of said power conversion apparatus and said command signal being produced in response to a change in the operating state of said mimic conversion apparatus.

7. The improved power conversion apparatus of claim 6 in which there are two mimic conversion apparatuses, the first mimic conversion apparatus being characterized by a margin angle that is relatively smaller than the margin angle of said power conversion apparatus and being arranged to produce a first command signal upon changing from a normal operating state to a commutation failure operating state, and the other mimic conversion apparatus being characterized by a margin angle that is relatively smaller than the margin angle of said first mimic conversion apparatus and being arranged to produce a second command signal upon changing from its commutation failure operating state to its normal operating state, said capacitor changing means being actuated by said first command signal to add capacitance and being actuated by said second command signal to subtract capacitance.

8. In combination with an electric power converter comprising a plurality of load-current conducting solid-state valves connected between a set of source terminals and a set of load terminals, at least one of said sets being energized by alternating voltage, and means for generating during each cycle of alternating voltage a family of trigger signals for turning on the respective valves in a predetermined sequence; incipient commutation failure detecting means comprising:

(a) a mimic conversion apparatus which is a reduced-scale, increased-sensitivity equivalent of said power converter;
(b) first means for connecting said mimic apparatus to said set of source terminals;
(c) second means for connecting said mimic apparatus to said set of load terminals;
(d) third means for connecting said mimic apparatus to said trigger signal generating means;
(e) the parameters of said detecting means being so selected that said mimic apparatus operates in synchronism with said power converter but with a relatively smaller margin angle; and
(f) means for signalling any commutation failure in said mimic apparatus.

9. The combination of claim 8 in which said mimic conversion apparatus comprises (i) a plurality of controlled switching components interconnected between said first and second means and arranged to form a circuit that is the mimic of said power converter, said switching components being turned on in sequence in response to said trigger signals, and (ii) means connected in circuit with said switching components for limiting the current conducted thereby to a maximum level higher than the magnitude of normal current that is conducted during ordinary operation but lower than the magnitude of fault current that otherwise tends to flow when commutation fails, said signalling means being responsive to fault current attaining said maximum level.

10. The combination of claim 9 in which said set of source terminals is energized by 3-phase alternating voltage and said first means comprises a transformer whose windings are so arranged that the voltage applied to said mimic apparatus lags the voltage energizing said source terminals.

References Cited
UNITED STATES PATENTS

| | | | |
|---|---|---|---|
| 2,587,151 | 2/1952 | Hansen | 321—7 |
| 3,300,712 | 1/1967 | Segsworth | 323—105 |

WILLIAM H. BEHA, JR., Primary Examiner

U.S. Cl. X.R.

219—10.77; 321—13; 323—105